United States Patent Office

3,345,185
Patented Oct. 3, 1967

3,345,185
FROZEN DESSERT
Joseph P. Pisani, Mount Prospect, and Luther D. Hilker, Evanston, Ill., assignors to National Dairy Products Corporation, New York, N.Y., a corporation of Delaware
No Drawing. Filed July 29, 1965, Ser. No. 475,853
5 Claims. (Cl. 99—136)

ABSTRACT OF THE DISCLOSURE

A low fat frozen dessert is provided having the body characteristics of ice cream or ice milk and comprising less than 0.5 percent by weight of fat and containing milk solids not fat, corn syrup solids, sucrose, water and stabilizer. The corn syrup solids are provided at a weight ratio to sucrose in the range of about 1:1 to about 2:1. The low fat frozen dessert of the present invention is not "sandy." Stabilizer levels of less than one percent may be provided to give body characteristics like ice cream or ice milk and help maintain the desired body and texture of the frozen dessert under conditions of storage or heat shock.

---

This invention relates to frozen desserts and particularly to frozen desserts having a low fat content.

In the field of frozen desserts it has been found desirable to produce frozen desserts which have low butterfat content. This type of frozen dessert is particularly desirable in diets which restrict the intake of fats. It is particularly desirable to produce a frozen dessert which has substantially all of the desirable qualities of conventional ice cream or ice milk while limiting the total fat content to less than that present in either ice cream or ice milk. Such frozen desserts will hereafter be referred to as "low-fat frozen desserts."

Such low-fat frozen desserts comprise relatively high percentages of milk solids not fat, which will hereinafter sometimes be referred to as MSNF. This can result in a defect, due to crystallization of lactose or milk sugar, which is generally known as "sandiness." Sandiness may occur whenever the concentration of lactose exceeds that required to produce a saturated solution. Thus, due to the high level of lactose in MSNF, sandiness occurs in frozen desserts at percentages of MSNF in excess of about 11 percent to 12 percent, whereas it is desirable in low-fat frozen desserts to provide a composition having as high a proportion of MSNF as possible in order to produce a frozen dessert that has full body and desirable texture.

Various methods have heretofore been used to alleviate the problem of sandiness but they are objectionable from a cost standpoint and may also produce subsidiary effects that are detrimental. Thus, it is known to add gelatin to frozen desserts to retard or eliminate crystallization of lactose. (See United States Letters Patent No. 2,558,453.) Addition of gelatin is objectionable because it contributes a mouth "feel" which is not characteristic of frozen desserts. It is also known to utilize MSNF that has been treated by contacting with a base ion exchange material. This method is objectionable because of the relatively complex equipment that must be used and maintained, resulting in higher costs.

It is the primary object of the present invention to provide a frozen dessert with low fat content. It is another object of this invention to provide a frozen dessert with relatively high levels of milk solids not fat that nevertheless has a smooth texture and is not "sandy." A particular object of the present invention is to provide a frozen dessert with the characteristics of ice cream or ice milk that has a lower percentage of fat.

These and other objects of the invention are more particularly set forth in the following detailed description.

In general, the objects of this invention are accomplished by preparing a mixture of condensed skim milk (or other source of MSNF), corn syrup solids, cane sugar, stabilizer, water, and flavoring, and thereafter pasteurizing, homogenizing and freezing the mixture under agitating conditions to provide a frozen dessert with desired overrun. Overrun for the purposes of this application is defined as the volume of gas contained in the finished frozen product as compared to the volume of solids, expressed as a percentage. Thus a frozen dessert comprising 50 volume percent gas and 50 volume percent solids has an overrun of 100 percent.

More particularly, in accordance with the present invention, there is provided a frozen dessert which comprises more than about 12 percent milk solids not fat, and preferably comprises about 13 percent of milk solids not fat.

The frozen dessert further comprises corn syrup solids and cane sugar at respective levels to provide a weight ratio of corn syrup solids to cane sugar in the range of about 1:1 to about 2:1.

Heretofore, frozen desserts comprising MSNF in excess of 12 percent by weight have resulted in lactose crystallization and accompanying sandiness. It is a surprising and unexpected result of the present invention that a frozen dessert is provided with excellent texture and flavor and with no evidence of sandiness despite the relatively high content of MSNF. It is believed that this result is at least partially due to the use of a substantially higher ratio of corn syrup solids to cane sugar as set forth above. As indicated, the ratio of corn syrup solids to cane sugar may be from about 1:1 to 2:1, preferably between about 1.5:1 to 1.7:1, for example 1.6:1. The level of corn syrup solids may be from about 10 percent to about 15 percent by weight of frozen dessert, and the level of cane sugar may be from about 10 percent to about 7 percent.

Although it is not intended that the scope of the present invention be limited to a particular theory, it is believed that the corn syrup solids serve to inhibit the nucleation of crystals of the less soluble disaccharide, lactose, by remaining dispersed among the crystals initially formed at the temperature used for freezing.

The concentration of water in the mix is adjusted to keep the concentration of total solids between about 33 percent and 37 percent, preferably between about 34 percent and 36 percent, for example 35 percent, expressed as weight percent of total mix.

Flavoring may be added at any convenient point in the process, but is preferably added after pasteurization to avoid the loss of volatile materials. Flavorings such as fruit syrups, cocoa, or vanilla are added in proportions to produce an agreeable product. The exact amount added will, of course, depend on the strength of the flavoring.

Stabilizers are added to help maintain the desired body and texture under conditions of extended storage or heat shock. Stabilizer levels of less than 1 percent are used, preferably between about .15 percent and about .4 percent.

Thus, the range of levels of ingredients in the low-fat frozen dessert of the present invention may be as set forth in Table I.

TABLE I

| | Weight percent |
|---|---|
| Milk solids not fat | 12–14 |
| Corn syrup solids | 10–15 |
| Cane sugar | 10–7 |
| Ratio corn syrup solids:cane sugar | 1:1–2:1 |
| Stabilizer | <1 |
| Water | (1) |

[1] Sufficient to provide a solids level between 33–37.

Composition containing more than about 14 percent MSNF tend to be mealy, gummy, and less desirable in flavor, while compositions containing less than about 12 percent MSNF have a weak body and are icy.

In preparing the low-fat frozen dessert of the present invention, a mix is prepared comprising the desired levels of respective components, and the mix is pasteurized and homogenized in a conventional manner. After homogenization, flavoring may be added and the mixture is frozen in a suitable continuous or batch freezer, such a Vogt continuous freezer, with means for continuous agitation so that air or other innocuous gas, such as nitrogen, is incorporated during the freezing process to provide a frozen dessert with an overrun of 100 percent or less.

Example I

As an example of the practice of the present invention, a chocolate-flavored mix was prepared comprising the following:

| | Weight percent |
|---|---|
| Condensed skim milk (30% solids) | 43 |
| Comprising MSNF | 13 |
| Water | 31 |
| Corn syrup solids | 13 |
| Cane sugar | 11 |
| Cocoa | 1.5 |
| Stabilizer | .2 |

The weight ratio of corn syrup solids to cane sugar was 1.2:1.

The corn syrup solids, cane sugar, cocoa, and stabilizer were added to cold condensed skim milk and water in a supply vat with constant agitation. A timing pump was set to deliver the mix through a plate heater and homogenizer at a constant rate. The mix was heated to a temperature of 220° F. for a hold time of 15 seconds as it passed through the heater. The heated mix was cooled to 130° F. by passing through the regenerator section of the plate heater and was then homogenized at 2000 p.s.i.g. The homogenized mix was cooled to 40° F. by passing it through the chilled water section of the plate heater. Vanilla flavoring was added at a level of ½ ounce per 10 gallons of mix and the mix was frozen in a Vogt continuous freezer under conditions which provided 100 percent overrun.

The resulting product was a delicious ice cream-like frozen dessert comprising less than 0.5 percent fat.

Example II

As a further example of the practice of the present invention, a vanilla-flavored mix was prepared comprising the following:

| | Weight percent |
|---|---|
| Condensed skim milk (30% solids) | 43 |
| Comprising MSNF | 13 |
| Water | 34.5 |
| Corn syrup solids | 13.5 |
| Cane sugar | 8.5 |
| Stabilizer | .2 |

The weight ratio of corn syrup solids to cane sugar was 1.6:1.

The mix was prepared, and was thereafter frozen by the method of Example I with one ounce of vanilla extract and one ounce of vanilla sugar being added for each 10 gallons of mix before freezing.

The resulting product was a delicious vanilla flavored frozen dessert comprising less than about 0.5 percent fat.

It is preferred to add the corn syrup solids in the form of liquid corn syrup. The water content of the liquid corn syrup must then, of course, be allowed for.

It is understood that minor variations in both composition and process may be made without departing from the spirit of the invention. Various of the features of the invention are set forth in the following claims.

What is claimed is:

1. A low-fat frozen dessert having the characteristics of ice milk or ice cream, and having less than about 0.5 percent by weight of fat and comprising milk solids not fat, corn syrup solids, sucrose and water, said milk solids not fat being present at a level of more than about 12 percent by weight, said corn syrup solids and said sucrose being present at respective levels sufficient to provide a weight ratio of corn syrup solids to sucrose in the range of from about 1:1 to about 2:1, the total solids content of said frozen dessert being between about 34 percent and about 37 percent by weight and the body characteristics of the frozen dessert being that of ice milk and ice cream.

2. A low-fat frozen dessert having the characteristics of ice milk or ice cream, and having less than about 0.5 percent by weight of fat and comprising milk solids not fat, corn syrup solids, sucrose, and water, said milk solids not fat being present at a level sufficient to provide an ice cream-like texture to said low-fat frozen dessert, said corn syrup solids being present in the range of from about 10 percent to about 15 percent by weight, said sucrose being present in the range of from about 10 percent to about 7 percent by weight, the weight ratio of said corn syrup solids to said sucrose being in the range of from about 1:1 to about 2:1, the total solids content of said frozen dessert being between about 34 percent and about 37 percent by weight and the body characteristics of the frozen dessert being that of ice milk and ice cream.

3. A low-fat frozen dessert having the characteristics of ice milk or ice cream, and having less than about 0.5 percent by weight of fat and comprising milk solids not fat, corn syrup solids, sucrose and water, said milk solids not fat being present at a level between about 12 percent and about 14 percent by weight, said corn syrup solids and said sucrose being present at respective levels sufficient to provide a weight ratio of corn syrup solids to sucrose in the range of from about 1:1 to about 2:1, the total solids content of said frozen dessert being between about 34 percent and about 37 percent by weight and the body characteristics of the frozen dessert being that of ice milk and ice cream.

4. A low-fat frozen dessert having the characteristics of ice milk or ice cream, and having less than about 0.5 percent by weight of fat and comprising milk solids not fat, corn syrup solids, sucrose, flavoring, stabilizer, and water, said milk solids not fat being present at a level between about 12 percent and about 14 percent by weight, said corn syrup solids being present in the range of from about 10 percent to about 15 percent by weight, said sucrose being present in the range of from about 10 percent to about 7 percent by weight, said flavoring being added at a level sufficient to provide desired flavoring strength, said stabilizer being present at a level less than about 1 percent by weight and in an amount which provides the frozen dessert with body characteristics of ice milk and ice cream, the total solids content of said frozen dessert being between about 34 percent and about 37 percent by weight.

5. A low-fat frozen dessert having the characteristics of ice milk or ice cream, and having less than about 0.5 percent by weight of fat and comprising milk solids not fat, corn syrup solids, sucrose, flavoring, stabilizer, and water, said milk solids not fat being present at a level of 13 percent by weight, said corn syrup solids being present in the range from about 10 percent to 15 percent by weight, said sucrose being present in the range of from about 10 percent to about 7 percent by weight, the weight ratio of said corn syrup solids to said sucrose being in the range of from about 1.2:1 to about 1.6:1, said flavoring being added at a level sufficient to provide desired flavoring strength, said stabilizer being present at a level of .2 percent by weight and in an amount which provides the frozen dessert with body characteristics of ice milk and ice cream, the total solids content of said frozen dessert being between about 34 percent and about 37 percent by weight.

References Cited

UNITED STATES PATENTS 2,558,453  6/1951  Minster _____ 99—136

OTHER REFERENCES

Webb et al.: By-Products From Milk, Reinhold Publishing Co., N.Y., 1950, p. 125.

A. LOUIS MONACELL, *Primary Examiner.*

J. M. HUNTER, *Assistant Examiner.*

Disclaimer 3,345,185.—*Joseph P. Pisani*, Mount Prospect, and *Luther D. Hilker*, Evanston, Ill., FROZEN DESSERT. Patent dated Oct. 3, 1967. Disclaimer filed Oct. 13, 1969, by the assignee, *Kraftco Corporation*.
Hereby enters this disclaimer to all the claims of said patent.
[*Official Gazette December 16, 1969.*]